July 20, 1965  E. W. TODD  3,195,651
ADJUSTABLE QUICK HITCH
Filed Jan. 22, 1964  2 Sheets-Sheet 1
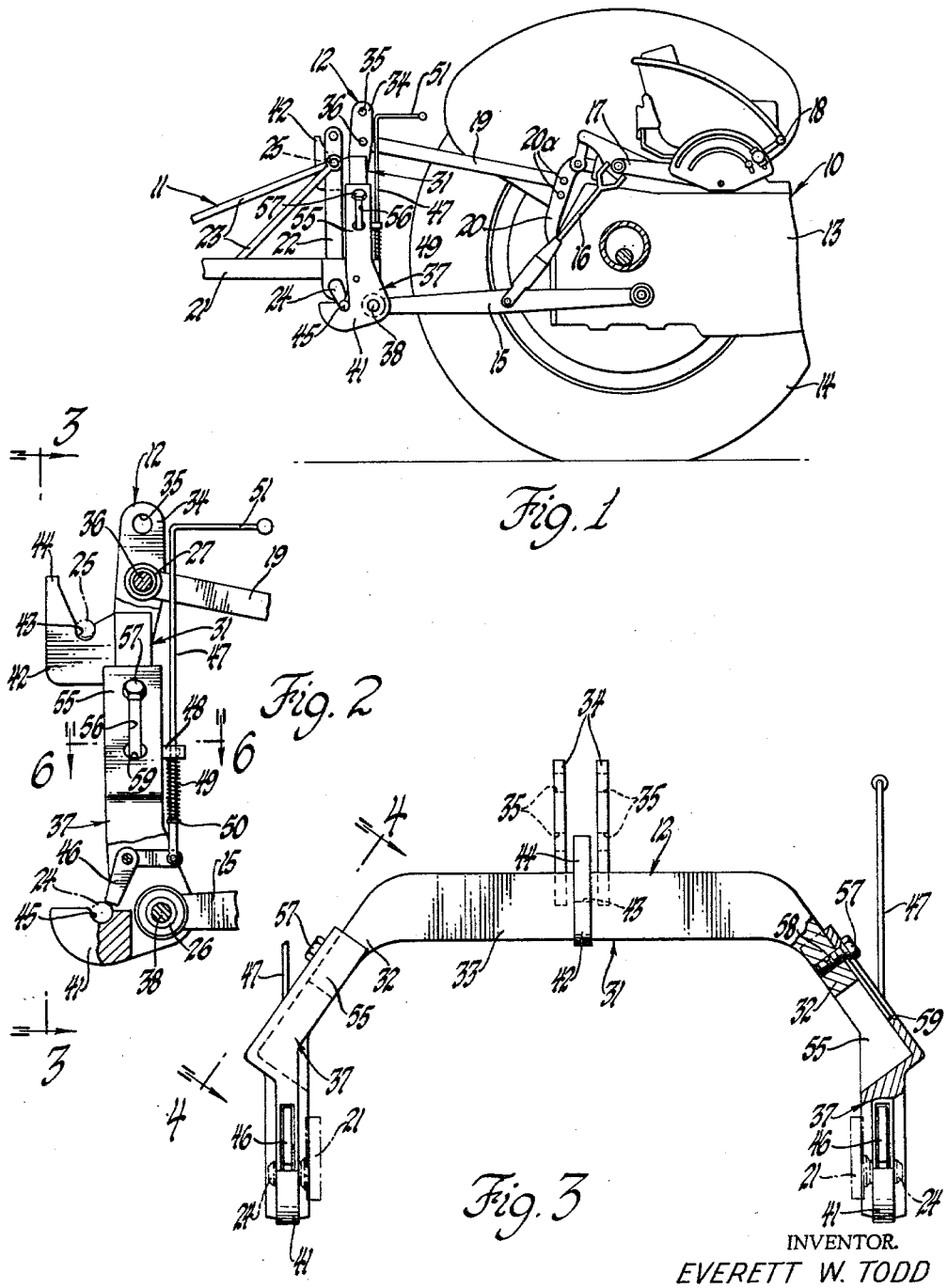
INVENTOR.
EVERETT W. TODD
BY
Wolfe, Hubbard, Voit & Osann
ATTORNEYS.

INVENTOR.
EVERETT W. TODD 3,195,651
ADJUSTABLE QUICK HITCH
Everett W. Todd, Dearborn, Mich., assignor to Massey-Ferguson Inc., Detroit, Mich., a corporation of Maryland
Filed Jan. 22, 1964, Ser. No. 339,451
4 Claims. (Cl. 172—272)

The present invention relates generally to agricultural tractors and more particularly concerns an improved implement hitch linkage for such tractors.

The three-point hitch linkage has been widely accepted for attaching mounted and semi-mounted implements to a tractor whereby a portion of the implement weight and suction forces are transferred to the tractor to increase the traction of the tractor's rear wheels. In the conventional "Ferguson system" the tractor is equipped with a pair of power operated trailing draft links universally pivoted at their forward ends on the tractor body and pivoted to a pair of spaced points on the implement by pin and socket connections. A third link located above and between the draft links interconnects an upstanding mast on the implement to an upper hitch point on the tractor. This upper link is also typically connected to the implement and tractor by pin and socket connections.

When it is desired to connect an implement to a tractor having such a three-point hitch linkage, it is necessary to carefully align the tractor and implement and bring them together so that the sockets at the ends of the three trailing links can be placed over the respective pins on the implement. This usually requires considerable skill and accurate maneuvering by the tractor operator until all three of the links can be connected to the implement. In many instances the tractor operator must dismount several times before the proper coupling position is achieved. Alternatively, the operator or an assistant must "bully" the implement around by essentially brute strength in order to complete the coupling.

In order to alleviate the foregoing problems associated with coupling an implement to a three-point hitch tractor, quick hitch devices have been developed for attachment to the trailing ends of the three hitch links of the tractor. Typically, these quick hitch attachments comprise rigid frames coupled to the ends of the three hitch links and have rearwardly extending projections with upwardly opening notches adapted to receive the three spaced draft pins on the implement. Latching means are also provided for keeping the implement draft pins in the notches during operation and for releasing the pins when the implement is disconnected.

These quick hitch attachments have greatly facilitated the coupling and uncoupling operation of an implement to the tractor. They have also permitted the rapid and convenient interchange of the tractor with different implements, so long as the three draft pins on the implement are uniformly spaced on the various implements. However, not all implements have the same draft pin spacing, and indeed, identical pin location and spacing is not practical on all types and sizes of implements. This is because the location of the draft pins in large part determines the real lines of force that are exerted between the tractor and the implement and the optimum locations of the lines of force, of course, are not identical in implements of different sizes and types.

Accordingly, it is the primary aim of the present invention to provide an improved quick hitch attachment for coupling an implement to a three-point hitch tractor that is quickly and conveniently adjustable to accommodate a wide variety of implements having different draft pin spacings and locations.

It is a more particular object to provide such an improved quick hitch attachment which is adjustable to simultaneously change both the vertical and the horizontal location of the implement draft pin receiving notches on the hitch attachment.

A further object is to provide such quick hitch attachments with an adjusting means of the above type which due to its novel construction affords a rigid hitch structure and yet is adjustable by the movement of only two hitch members. A related object is to permit the adjusting movement of each of the two hitch members by loosening but a single retaining device.

Other objects and advantages of the invention will become more readily apparent upon reading the following detailed description and upon reference to the drawings, in which:

FIGURE 1 is a fragmentary side elevation of the rear end portion of an agricultural tractor, with one rear wheel removed, and the front end portion of an implement coupled to the tractor by an improved quick hitch attachment of the present invention;

FIG. 2 is an enlarged fragmentary side elevation, partly in section, of the novel hitch attachment;

FIG. 3 is a rear elevation, partly in section, of the attachment substantially as seen from line 3—3 in FIG. 2;

Figure 4:
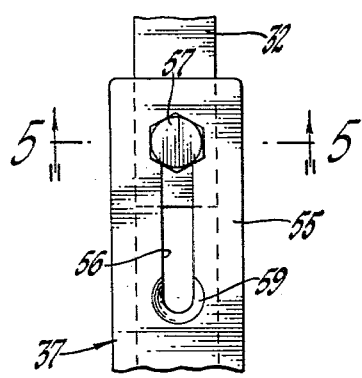
FIG. 4 is a further enlarged partial view of one of the adjustable members of the hitch attachment shown in the preceding figures.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning now to the drawings, there is shown in FIGURE 1 the rear end portion of a tractor 10 and the front end portion of an implement 11 coupled to the tractor by means of an improved quick hitch attachment 12 embodying the present invention. The tractor 10 has a frame portion 13 supported on steerable front and driven rear wheels 14, only one of the latter being shown.

In the illustrative tractor, a pair of trailing draft links 15 are pivotally mounted on the rear end portion of the tractor frame 13. The draft links are vertically movable by means of a power lift arrangement including drop links 16 connected to lift arms 17 operated by an internal hydraulic ram (not shown) under control of the tractor operator by means of a quadrant lever 18. The tractor 10 also carries a third hitch link 19 pivotally mounted on a bracket 20 at the rear end portion of the tractor above and between the draft links 15. The bracket 20 is preferably formed with a plurality of apertures 20a for receiving a connecting pin on which the upper link 19 is pivoted.

The front portion of the implement 11, in this case, includes a main frame 21 supporting an A-frame or mast 22 which is reinforced by rods 23 interconnecting the main frame and the A-frame. The main frame 21 carries a pair of spaced apart, laterally projecting draft pins 24 and the A-frame 22 locates another draft pin 25 above and between the pins 24.

As shown in FIGS. 1 and 2, the attachment 12 is mounted on the trailing ends of the draft links 15 and upper link 19. Each of the links 15, 19 is formed with a socket 26 and 27, respectively, for this purpose. The attachment 12 includes a rigid frame 31 of an inverted, generally U-shaped configuration defining a pair of downwardly and outwardly diverging legs 32 interconnected by a generally horizontal saddle portion 33. The saddle 33 mounts a pair of spaced brackets 34 which project upwardly therefrom and which are formed with a plurality of apertures 35 adapted to receive a pin 36 connecting the upper part of the attachment with the socket 27 in the trailing end of the upper link 19.

For securing the attachment frame 31 to the lower draft links 15, the legs 32 each mount an extension member 37. Each extension member 37 carries a laterally extending connecting pin 38 adjacent the lower end thereof which is adapted to be received in the socket 26 at the trailing end of one of the draft links 15. The pins 36 and 38, of course, may be retained within the respective sockets 27, 26 in any suitable manner such as by keys or the like, not shown. From the foregoing, it will be seen that the attachment 12 serves to interconnect the trailing ends of the tractor hitch links 15, 19 in a predetermined spaced relationship.

To permit quick coupling of the hitch attachment 12 and the implement 11, each of the leg extension members 37 and the frame saddle 33 carry rearwardly extending hooks 41 and 42, respectively engageable with the implement draft pins 24, 25. The upper hook 42 is preferably rigidly secured to the saddle 33 and defines an upwardly opening notch 43 adapted to receive the upper implement draft pin 25. An upstanding nose 44 at the rear portion of the hook 42 serves to guide the pin 25 into the notch 43 during coupling of the implement and to prevent the pin from escaping from the notch during operation of the implement.

Figure 6:
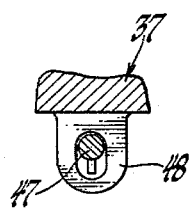
FIG. 6 is a fragmentary sectional view taken substantially along the line 6—6 in FIG. 2.

Each of the lower hooks 41 extends rearwardly from the lower portion of the respective leg extension members 37 and defines an upwardly opening notch 45 to receive one of the laterally spaced implement draft pins 24. The pins 24 are retained in the notches 45 by means of a locking mechanism including a bell crank 46 pivotally mounted on each of the extension members 37. A pair of control rods 47 are coupled respectively to one arm of each bell crank 46 and extend upwardly through guides 48 secured to each of the members 37 (see FIG. 6). A compression spring 49 interposed between a stop 50 on each control rod 47 and guide 48 serves to bias the rods downwardly and thus rock the other arm of the bell cranks 46 to lock the draft pins 24 in their notches 45. To release the draft pins 24, a handle 51 on each control rod is disposed within reach of the tractor operator and can be raised by swinging the bell cranks 46 away from the pins 24.

Figure 7:
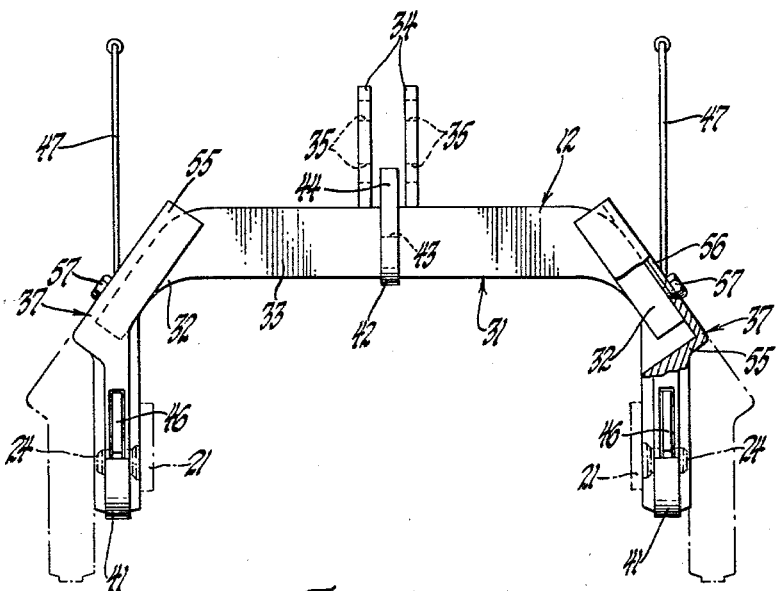
FIG. 7 is a plan view similar to FIG. 3 with two positions of the adjustable members being shown in solid lines and dash lines, respectively.

In accordance with the present invention, each of the leg extension members is adjustably secured to the downwardly and outwardly inclined frame legs 32. Accordingly, adjustment of the extension members 37 with respect to the inclined legs 32 simultaneously changes both the relative horizontal and vertical locations of the hooks 41, 42 (see FIG. 7). In this way, the quick hitch attachment 12 can be quickly and conveniently adjusted to accommodate various sizes and types of implements which have different draft pin locations.

Figure 5:
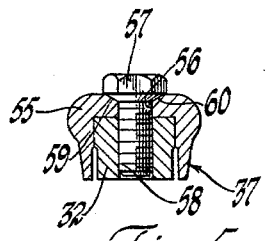
FIG. 5 is a section taken substantially along the line 5—5 in FIG. 4.

In the preferred embodiment, the upper end 55 of each extension member defines a slot 56 through which a bolt 57 is inserted and screwed into a threaded aperture 58 defined in each frame leg 32 (see FIGS. 4 and 5). Thus, it is only necessary to loosen a single bolt on each frame leg 32 in order to change both the height and width of the hook spacings.

It is also contemplated that most of the implements to be used with a given tractor can be grouped into one or the other of two categories, depending upon their size and draft characteristics. Moreover, the draft pins for implements of each category can be uniformly located and spaced. Therefore, since the tractor 10 will usually be used to pull one or the other of these two categories of implements, it is desirable to provide means for quickly and conveniently locating and locking the leg extension members 37 in position to locate the hooks 41, 42 for either category of implements. To this end, the slots 56 are each formed to define a pair of countersunk recesses 59 to receive a tapered neck portion 60 of the bolts 57 when the extension member is moved to a definite adjustment position for each category of implements. As best seen in FIGS. 3 and 4, the countersunk recesses 59 in the illustrative attachment 12 are located at the opposite ends of the slots 56.

Pursuant to another aspect of the invention, the upper end 55 of each extension member 37 is formed with a generally channel-shaped configuration dimensioned to snugly overlie the outer surface of one of the inclined legs 32. In this way, relative pivotal movement between the members 37 and the legs 32 about the bolts 57 may be prevented even when the extension members are moved outwardly on the legs. This, of course, facilitates the one bolt adjustment connection which has been previously discussed.

From the foregoing, it will be seen that the novel quick hitch attachment 12 may be easily and conveniently adjusted to accommodate various sizes and types of implements having different draft pin locations. Moreover, a single bolt adjustment permits simultaneous vertical and horizontal positioning of the draft pin receiving hooks. In addition, this relatively simple, yet rugged construction is economical to mass produce and is durable and trouble free in operation.

I claim as my invention:

1. A quick hitch attachment for a tractor of the three-point hitch type having a pair of spaced apart draft links and an upper hitch link comprising, in combination, a rigid frame member defining a pair of downwardly and outwardly diverging legs interconnected by a generally horizontal saddle portion, a bracket secured to said saddle portion for connection to the trailing end of said upper link, an extension member secured to each of said legs and extending downwardly and outwardly therewith, each of said extension members carrying a laterally extending pin for connection with the trailing end of one of said draft links, an upper rearwardly extending hook defining an upwardly opening notch secured to said saddle portion, and a lower rearwardly extending hook defining an upwardly opening notch formed at the lower portion of each of said extension members, said extension members being slidably mounted on said legs whereby adjustment of said members relative to said legs results in simultaneously changing the relative vertical and horizontal locations of said upper and lower hooks.

2. A quick hitch attachment according to claim 1 wherein each of said extension members defines a slot in the upper portion thereof and a bolt received in said slot is threadedly engaged in an aperture formed in said leg to define the slidable mounting of said extension members on said leg.

3. A quick hitch attachment according to claim 2 wherein said bolt is formed with a tapered neck portion and said slot is formed with a plurality of countersunk recesses to define positive adjustment positions of said extension member with respect to said leg.

4. A quick hitch attachment according to claim 1 wherein said extension members are generally channel-shaped at the upper ends thereof and dimensioned to overlie the outer surface of said legs whereby relative arcuate movement between said extensions and said legs is prevented.

References Cited by the Examiner
UNITED STATES PATENTS

| | | |
|---|---|---|
| 174,251 | 2/76 | Jacobus et al. |
| 472,015 | 3/92 | Fariss _____ 172—744 |
| 783,830 | 2/05 | Grabe. |
| 2,888,995 | 6/59 | Sorensen _____ 172—272 |
| 3,048,228 | 8/62 | Hess et al. _____ 172—272 |
| 3,090,639 | 5/63 | Virtue et al. _____ 280—479 |
| 3,116,075 | 12/63 | Hershman et al. _____ 172—272 |

FOREIGN PATENTS

| | | |
|---|---|---|
| 76,579 | 10/53 | Denmark. |
| 1,134,235 | 8/62 | Germany. |

T. GRAHAM CRAVER, *Primary Examiner*.